Sept. 11, 1923.

H. A. SMITH

TRAP

Filed Aug. 21, 1919

Herbert A. Smith, Inventor

By Edwards, Sager & Richmond, his Attorneys

Patented Sept. 11, 1923.

1,467,818

UNITED STATES PATENT OFFICE.

HERBERT ALWYN SMITH, OF BETHLEHEM, PENNSYLVANIA, ASSIGNOR TO ROLLER-SMITH COMPANY, A CORPORATION OF NEW YORK.

TRAP.

Application filed August 21, 1919. Serial No. 318,849.

*To all whom it may concern:*

Be it known that I, HERBERT A. SMITH, a citizen of the United States, residing at Bethlehem, in the county of Lehigh and State of Pennsylvania, have invented certain new and useful Improvements in Traps, of which the following is a specification.

This invention relates to steam or vapor traps and is particularly well adapted for use with the usual radiator for heating buildings.

The chief object of the invention is to provide a trap which will be simple and inexpensive in construction and durable and rugged in service, consisting of a minimum number of elements requiring no delicate adjustments to insure their proper operation. A further object of the invention is to construct the trap so that its action will not be appreciably affected by the surrounding air.

In the accompanying drawings illustrating one embodiment of the invention,

Figure 1:
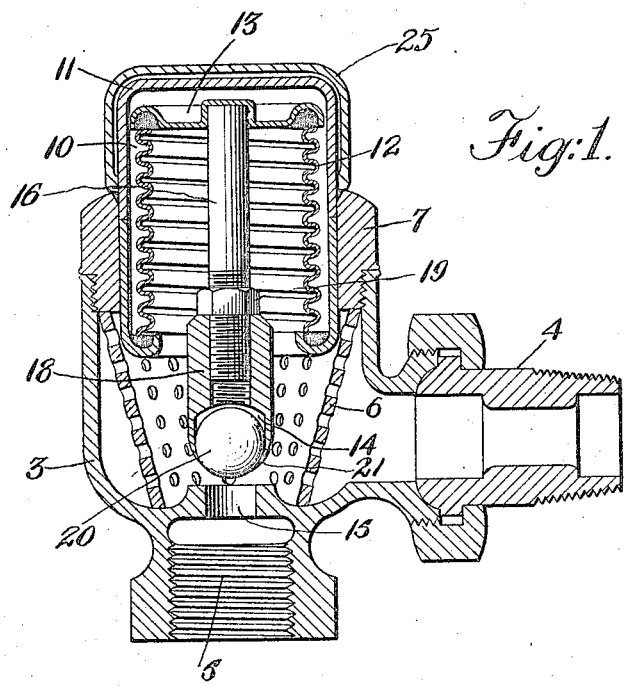
Fig. 1 is a vertical sectional view.
Figure 2:
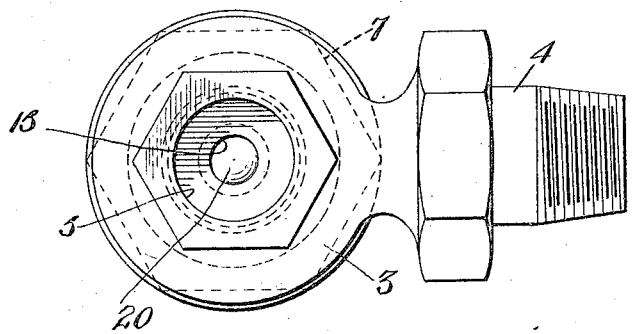
Fig. 2 is a bottom view of Fig. 1.

In the embodiment of the invention illustrated a trap body 3 is provided with a nipple 4 for the entrance of steam and with an outlet 5 for the condensate to drain away. Between the inlet and outlet is the strainer 6 comprising a perforated sheet in form of a hollow frustum of a cone with its lower, smaller end around the outlet and its upper, larger end beneath a cap nut 7 screwed into the top of the trap body 3.

The outlet 5 is controlled by a thermostatic valve carried by the cap nut 7 and operating to close the outlet whenever the temperature of the steam or water within the trap exceeds a certain amount. This thermostatic control comprises a rigid cylinder forming a chamber 10 which cylinder is fastened in place in the cap nut 7 at its lower portion. Within chamber 10 is a compressible member or diaphragm comprising a corrugated cylinder 12 fastened at its lower end as by soldering to the rigid cylinder forming chamber 10 and carrying a punched piston head 13 soldered thereto at its upper end and from this extends downward the valve stem 16, to the lower end of which is threaded the valve head 18 locked in adjusted position by lock nut 19. The valve head 18 is a hexagonal rod hollowed to form a socket as shown at 14 to house the ball valve 20 which is adapted to close the outlet opening 15 and is held loosely projecting from the valve head by slightly spinning over the lower edge thereof at 21. A volatile fluid partially fills the hermetically sealed space between the diaphragm 12 and member forming chamber 10; and vaporization of this fluid presses down the piston stop of the diaphragm and closes the outlet 15 by valve 20 whenever the interior of the diaphragm is heated sufficiently by the steam therein. Conversely cooling of the fluid will permit the diaphragm to expand and raise valve 20 to open the outlet and discharge the condensate from the trap body 3.

In the trap of this invention the diaphragm is in constant contact with the steam or condensate from inlet 4. A cap 25 of suitable heat insulating material covers the upper part 11 of the chamber 10 and protects the trap from influence of the temperature of the outside atmosphere. Such a cap holds the heat within the trap so that the action of the valve is controlled by the internal temperature of the radiator. When steam enters at the inlet 4, and passes through holes in the conical strainer 6, it heats the trap bringing about the expansion and closure referred to. When condensate at lower than steam temperature enters through the inlet, the chamber contents are similarly lowered in temperature, the spring action of the diaphragm retracts the valve head and the condensate is free to drain away through the outlet 5.

The trap as a whole is readily formed by the simple assembly of two parts with the strainer 6 between them. The lower part comprises the trap body 3 with nipple 4 and outlet 5, and the upper part is formed by cap screw 7 with the chamber 10, diaphragm 12, and valve 20 carried by it simply screwing into the lower part with the strainer 6 in place between them. The disassembly of the trap for inspection or repair is equally simple and is without danger of changing any adjustment. The ball valve 20 is self-centering between socket and seat ensuring a tight closure of the valve without the necessity of providing and maintaining absolute alinement of the parts. Due to the simple and rugged construction and the absence of any delicate parts, the length of the valve stem may be adjusted and the trap assembled at the factory and after assembly cannot be easily tampered with, so that in practice the trap is delivered ready for installation and service.

While this invention has been explained in connection with a specific embodiment the principle of it is not confined to the particular trap shown but is intended to cover such modifications thereof as fall within the scope of the appended claims.

I claim:

1. In a trap, the combination of a body portion having an inlet and outlet, a screw cap engaging said body portion, a rigid cylinder extending through and supported by said cap, a collapsible cylinder supported at its inner end by the inner end of said rigid cylinder and extending outwardly within said rigid cylinder, said collapsible cylinder having a closed outer end, and a valve for opening and closing said outlet and controlled by the closed end of said collapsible cylinder.

2. In a trap, the combination of a body portion having an inlet and outlet, a screw cap engaging said body portion, a rigid cylinder extending through and supported by said cap, a collapsible cylinder supported at its inner end by the inner end of said rigid cylinder and extending outwardly within said rigid cylinder, said collapsible cylinder having a closed outer end, a valve stem controlled by the closed end of said collapsible cylinder, and a ball valve carried by said valve stem for opening and closing said outlet.

3. In a trap the combination with an outlet and inlet, of a controlling valve, a thermostatic element comprising an outer rigid cylinder and an inner collapsible cylinder exposed to the temperature within the trap and an expansible fluid between said cylinders, means for connecting said valve to said thermostatic element, and a heat insulating cap covering on said trap to protect said thermostatic element from changes in temperature of the surrounding air.

4. In a trap, the combination of a body portion having an inlet and outlet, a screw cap engaging said body portion, a rigid cylinder extending through and supported by said cap, a collapsible cylinder supported at its inner end by the inner end of said rigid cylinder and extending outwardly within said rigid cylinder, said collapsible cylinder having a closed outer end, a valve for opening and closing said outlet controlled by the closed end of said collapsible cylinder, and a strainer encircling said valve and extending from around said outlet toward said cylinders.

5. A thermostatically controlled valve comprising an outer rigid cylinder, an inner corrugated tube carried thereby, a piston head on said tube moving in said cylinder, a volatile fluid between said tube and cylinder acting to compress said tube at predetermined temperature, a valve member carried by said head and comprising a stem, a downwardly open socket portion and a ball mounted in said socket portion.

6. In a trap, the combination of a body portion having an inlet and outlet, a screw cap engaging said body portion, a rigid cylinder extending through and supported by said cap, a collapsible cylinder supported at its inner end by the inner end of said rigid cylinder and extending outwardly within said rigid cylinder, said collapsible cylinder having a closed outer end, a valve for opening and closing said outlet controlled by the closed end of said collapsible cylinder, and a covering of heat insulating material on the outer portion of said rigid cylinder.

7. A trap formed by the assembly of two parts, one part comprising a generally cylindrical trap body, attachment nipple and outlet and the other part comprising a cap nut threaded into said trap body and carrying a thermostatically controlled valve adapted to close said outlet, and a strainer adapted to be contained between said parts.

HERBERT ALWYN SMITH.